Nov. 19, 1940.                    W. KENAN                    2,221,919
                            BRIDGE CONSTRUCTION
                    Filed Aug. 23, 1938         3 Sheets-Sheet 1
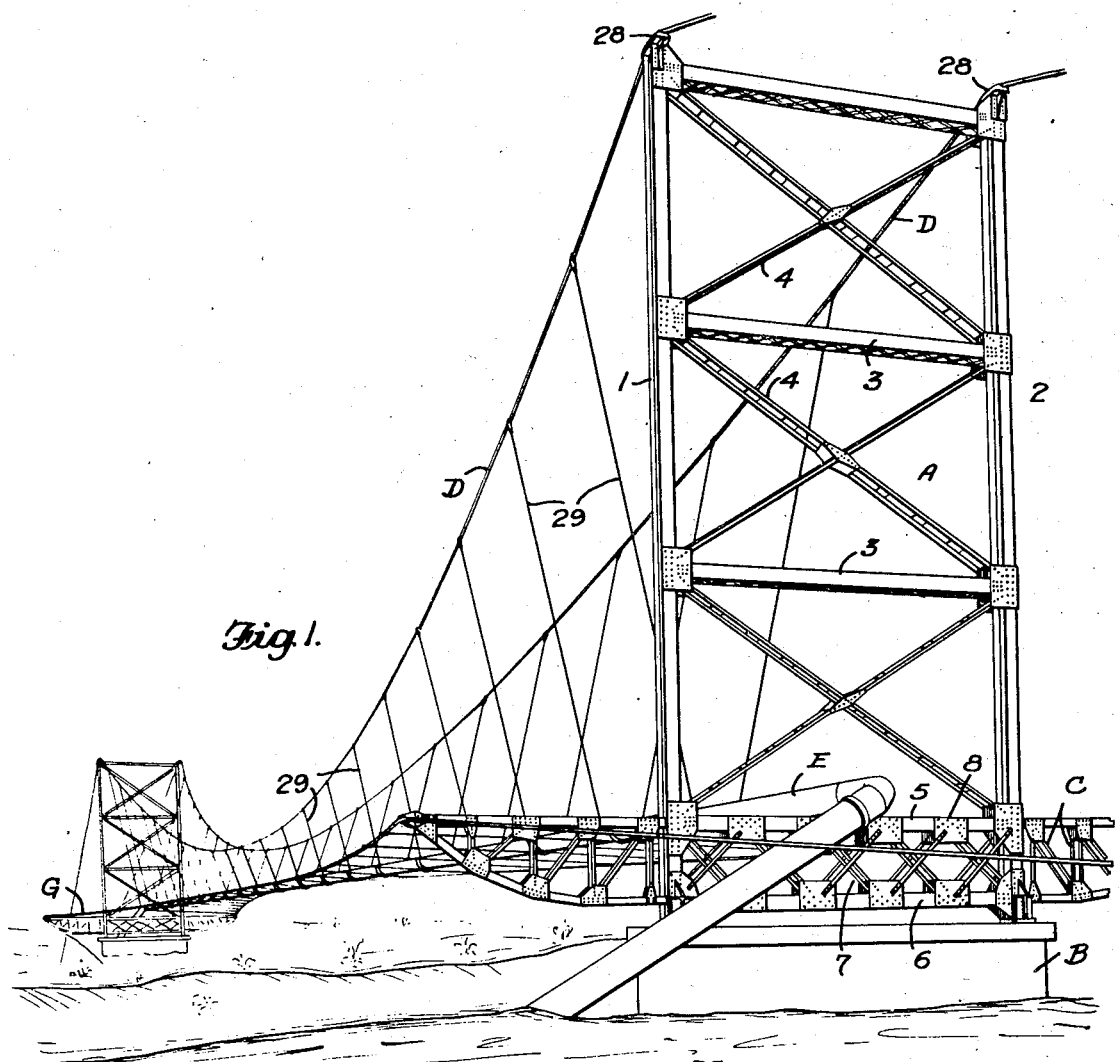
Fig. 1.
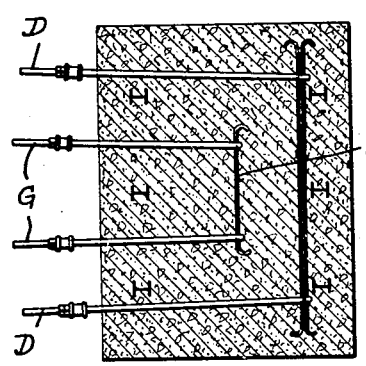
Fig. 11.
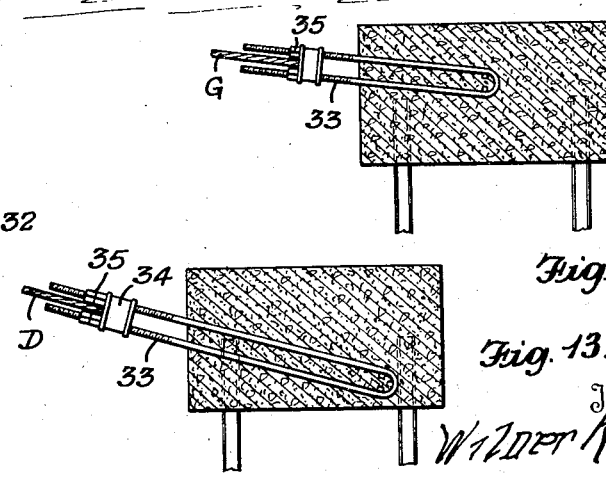
Fig. 12.
Fig. 13.
Inventor
Wilder Kenan
By Ralph J. Barrett
Attorney

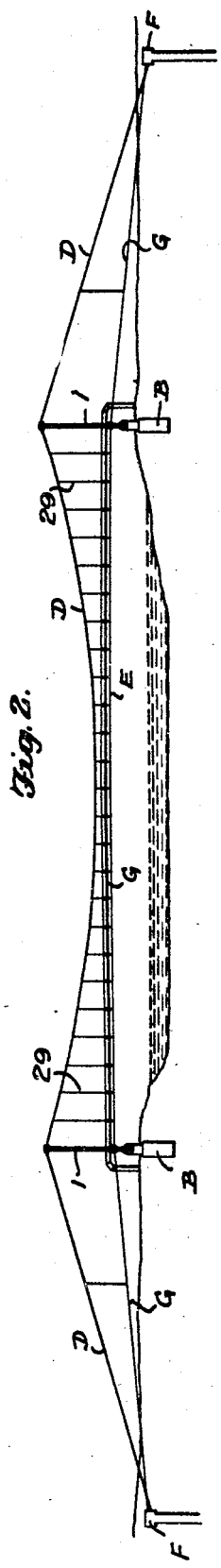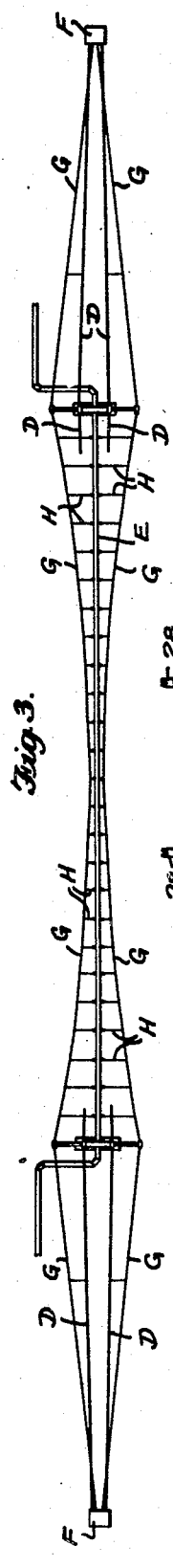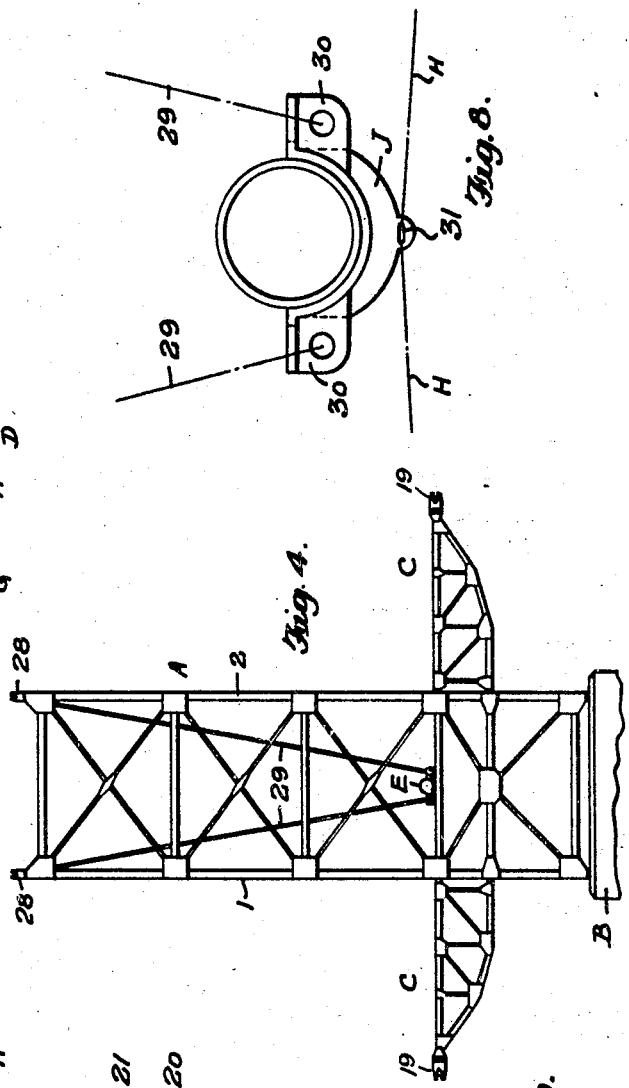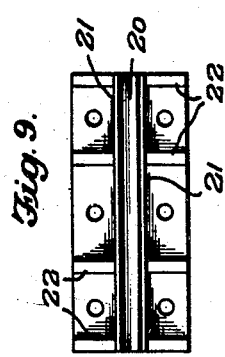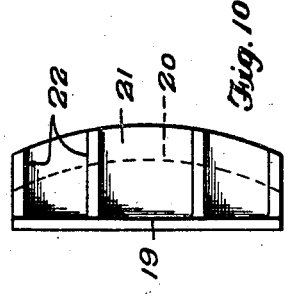

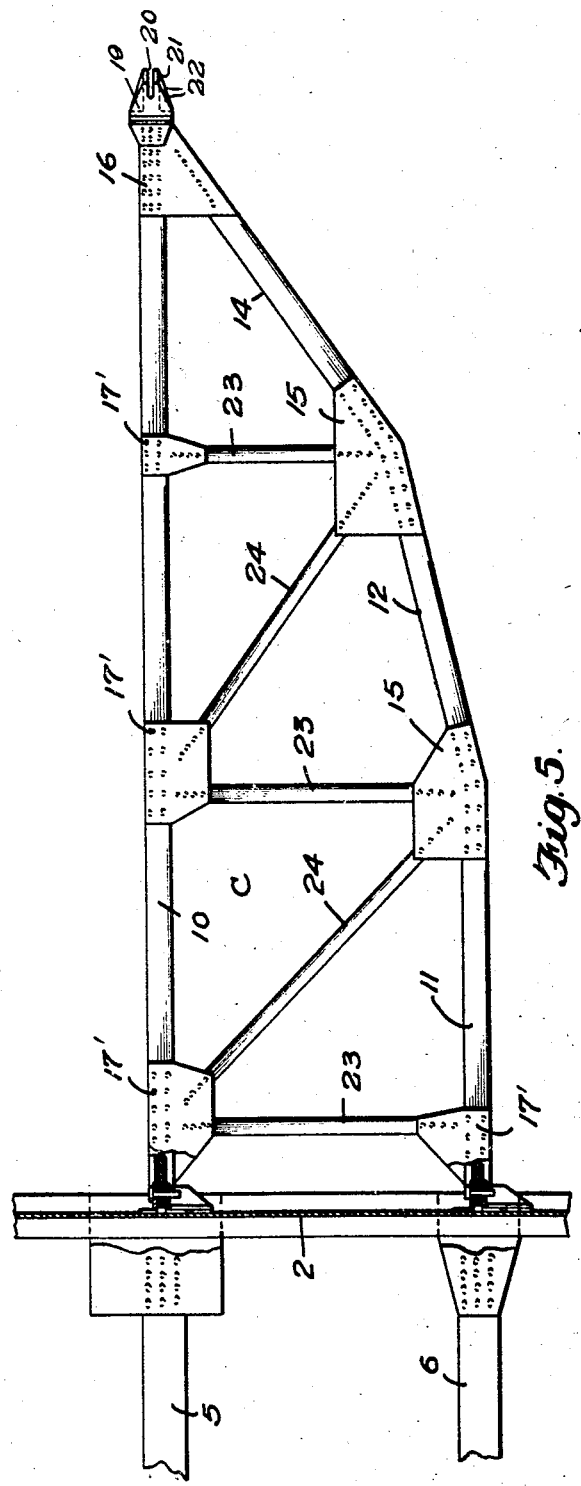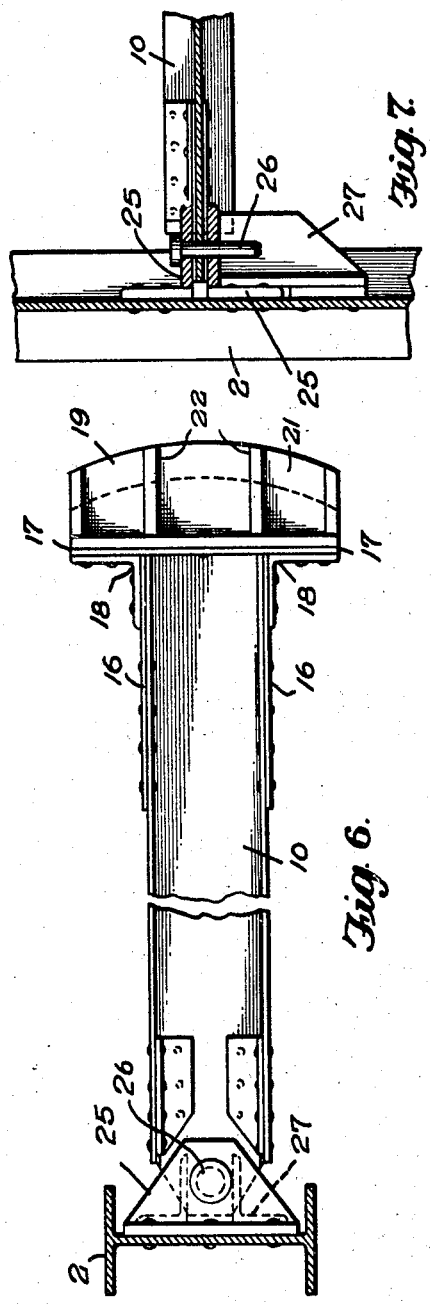

Patented Nov. 19, 1940

2,221,919

UNITED STATES PATENT OFFICE 2,221,919

BRIDGE CONSTRUCTION

Wilder Kenan, San Antonio, Tex.

Application August 23, 1938, Serial No. 226,351

11 Claims. (Cl. 14—19)

This invention relates particularly to a bridge construction of the pipe line type, utilized to suspend and support pipe sections which extend over streams and rivers or spaced earth formations.

The generally accepted method of transportation by pipe lines over rivers and streams and analogous formations has been the submergence thereof below the stream bed or water way being crossed. This method of crossing a river or stream has proven impractical, expensive and highly unsafe and unsatisfactory, in that such lines when crossing streams and rivers are subjected to washout hazards as well as pipe corrosions, and consequent danger present from leakage of material being transported.

The present invention comprehends a structure which will suspend a pipe line over a stream or river in an economical, safe and efficient manner.

More specifically, the invention comprehends a structure which will resist wind pressure induced by lateral or crossed winds and embodies the use of horizontal stiffening cables arranged upon shiftable cantilever structures and connected to the pipe supporting elements by guys so constructed and arranged as to retain such wind cables in horizontal parabolic form.

The invention further contemplates the supporting of the wind cables outwardly from the sides of the main towers and at the outer ends of steel cantilever trusses attached to each side of the main towers, the wind cables being curved downwardly and inwardly toward the pipe line to be suspended and being braced at points spaced from the towers by anchored back stays.

Because of the length changes in the wind cables from temperature contraction and expansion and further because of the elastic stretch of the wind cable back stays under tensile stress, it has been found essential to provide for this relative shifting by means of hinged or pivoted connections between the cantilever wind arms or trusses, the hinges or pivots being illustrated in the present disclosure as pintle connections although any suitable equivalent may be substituted.

The present invention further comprehends a definite relationship between the main suspension cables which extend over the top of the piers or towers and the wind cables which extend between the outer ends of the hinged or pivoted cantiler trusses or wind arms, this relationship being such as to provide uniform supporting characteristics throughout the span and at the same time permitting the essential shifting of the parts involved in the assembly due to changes in temperature and stretching under tensile stress.

Other objects will more clearly hereinafter appear by reference to the accompanying drawings forming a part of the specification and wherein like characters of reference designate corresponding parts throughout the several views in which—

Fig. 1 is a perspective view showing the structure and arrangement of parts between two towers.

Fig. 2 is a side elevation.

Fig. 3 is a top plan view.

Fig. 4 is an end elevation of one of the towers and piers.

Fig. 5 shows in elevation one of the cantilever elements connected to the adjacent tower structure.

Fig. 6 is a top plan view of the cantilever structure and its connection.

Fig. 7 is an enlarged transverse section through a cantilever hinge or pivot.

Fig. 8 is an elevation showing a saddle and a pipe section in position.

Fig. 9 is a top plan view of a cable saddle.

Fig. 10 is a side elevation of the elements shown in Figure 9.

Fig. 11 is a sectional view showing the structure for anchoring the main and wind cables, and Figs. 12 and 13 are vertical sections through Figure 11.

The structure generally includes the main supporting towers A supported on suitable piers B and each provided with the laterally extending hinged or pivoted wind cantilever trusses or arms C. Extending in spaced relation from tower to tower and at such point in its height as may be desirable are the main supporting cables D, which are sufficiently flexed to accommodate the required elevation of the pipe line E and extend beyond the towers to anchors F. The wind cables G may extend from the same anchorage if desired, and are arranged about the ends of the pivoted cantilever trusses or arms and then converge inwardly toward the pipe in parabolic form and are so retained by virtue of the connections H which extend upwardly and inwardly to the saddles J supporting the pipe line.

First, with reference to the main supporting structure, best illustrated in Fig. 1, it will be noted that the piers B are of suitable size and form, preferably of concrete construction, and essentially extend into the earth a suitable depth to provide the necessary footing for the towers A. The towers A are illustrated as of metallic form including the uprights 1 and 2 suitably spaced at each side of the pier B and cross braced by the spaced horizontal beams 3 and diagonals 4, the latter being connected at their intersections in the usual manner. The entire tower structure may be built in any desirable manner of suitable beams or fabricated elements as long as a rigid structure is assembled with ample means for supporting the load to which it is to be subjected, namely, the main supporting cables D and the parts suspended thereby. The towers are positioned at suitable points to obtain the essential footing and their height will be determined by the length of the intervening span.

The lower portion of the tower is provided with the relatively close horizontal cross beams 5 and 6 substantially braced by the diagonals 7 which are secured to the beams by the plates 8 as shown.

Extending horizontally from that portion of the tower defined by the horizontals 5 and 6 are the cantilevers C shown in detail in Figs. 5, 6 and 7. The form of cantilever illustrated in these figures has proven in practice desirable and such structure embodies the spaced horizontal chords 10 and 11 shown as formed of I-beams and arranged with their web horizontal, the upper beam projecting beyond the lower beam and comprising substantially the full length of the cantilever structure. The lower beam is connected to the outer extremity of the upper beam 10 by the angular I-beam sections 12 and 14 spliced by the plates 15 at their junctions. The upper beam 10 and the lower I-beam section 14 are likewise spliced at their junction by the plates 16, and a cross head 17 is fixed at the extremity of each cantilever and suitably braced by the angles 18 arranged as shown. To the cross head 17 the cable saddle 19 is bolted, this saddle being of the general type shown in Figures 9 and 10 and including the arcuate cable seat 20 defined by walls 21 positioned intermediate the structure and braced by webs 22. Uprights 23 of suitable construction and diagonals 24 complete each cantilever structure, such parts being riveted by the use of the plates 15, 16 and 17' at their junctions.

The cantilevers are each hinged or pivoted to the uprights 2 of the towers at points, as heretofore stated, substantially defined by the horizontal braces 5 and 6. While the present illustration shows the construction now being described it will be obvious that such arrangement may be varied or modified without departing from the spirit of the invention, provided the structure embodied comprehends the requisite strength to support the cooperating parts and to sustain the imposed load. In the illustration, spaced angle plates 25 are arranged transversely of the web of the uprights 2 a distance sufficient to permit the insertion of the reduced inner extremities of the horizontal cantilever parts 10 and 11 and permit the pivoted swinging movement of this part between the outwardly extending plates. The plates 25 and also the ends of the cantilevers are perforated, the perforations being located to permit their registration and the insertion of the pins 26. Vertical angles 27 are riveted over the plates 25 and the flanges of these vertical angles confine the parts and increase the strength of the assembly.

Saddles 28 are supported at the top of the uprights 1 and 2 of the pier structures, the saddles being of the general form illustrated in Figures 9 and 10 and including arcuate guideways across which the main supporting cables D extend.

Referring now to Figs. 2 and 3 it will be noted that the cables D extend from the anchors F, shown in detail in Figs. 11, 12 and 13 and overlie the saddles 28 heretofore mentioned. At points intermediate the towers A the main supporting cables D upon being placed across the saddles 28 assume a catenary form and from these cables a plurality of suspenders 29 are supported and connected at their lower extremities to the ears 30 of the pipe cradle J.

The wind cables G are connected at their extremities to the anchorage F and extend across the saddles 19 at the ends of the cantilevers C and are connected to the lower portion 31 of the pipe cradles J as illustrated in Fig. 8 by means of the connections H. The arrangement of these connections H is clearly shown in Fig. 3 and it will be noted that the cables H, when loaded by connection to the cradles J, retain the cables G in parabolic form. Such a formation of the cable G when so connected is illustrated in Fig. 3.

Figs. 11, 12 and 13 illustrate one method of anchoring both the main supporting cables and the wind cables, the anchoring embodying the use of reinforced concrete in which are embedded the transverse steel ties 32 about which the adjustable loops 33 forming the extremities of the cables are positioned. Other methods of anchoring the cables may be adapted, it being essential however, that some mode of adjusting the cables be provided. In the present instance the collars 34 are shiftable along the threaded extremities of the loops or U-bolts 33 by virtue of the threaded nuts 35 which engage the threaded extremities of the arms forming the loops or U-bolts.

From the foregoing it will be noted that the primary elements of the present structure are comprehended in those portions forming the wind bracing system and illustrated as steel cables placed on either side of the structure to form parabolic curves, the planes of which are horizontal or nearly horizontal. These parabolic curved wind cables are guyed to the suspended structure of the bridge by means of connections forming wind guy suspenders which are attached at one end to the pipe line supporting elements or cradles and at the other end to the wind cables, at each panel point of the bridge through which the lateral wind pressure exerted on the suspended portion of the bridge is transmitted to the wind cables, whereby it is resisted by the tensile strength of the wind cables themselves acting as horizontal suspension cables. The tensile stress so created by wind pressure on the exposed side of the suspended portion of the structure and induced through the wind guy suspenders or connections into the wind cables is eventually transferred to the main cable anchorages for proper resistance thereby. In order that the wind cables may be spaced from the sides of each main tower in order to have proper sag or deflection ratio to span length in determining the size and strength of wind cables required for each design case, and in order that the wind cables may be bent downward and inward and at the same time be supported at these points so they may be caused to intersect the main anchorages for end attachment thereto, the assembly incorporates the hingedly connected cantilever trusses or arms. As heretofore described these arms are attached to the sides of the main towers and extend laterally therefrom about the outer ends of which the cables pass. The downward and inward bending of the wind cables at the outer ends of the hinged cantilever truss arms results in downward and inward acting forces on the cantilever truss arm ends, which forces are resisted and transferred by the structural elements comprising the truss arms and through their hinged connection with the tower for proper dissipation in these elements of the bridge structure proper. These cantilever truss arms are necessarily hinged or movably connected to the main tower columns because of expansion and contraction temperature length changes of the wind cable backstays G and the elastic stretch of the wind cable backstays when stressed by wind pressure stress induced in the wind cables. It will be readily recognized that these hinged cantilever truss arms are an important and vital feature of the entire wind bracing conception.

The exact shape and design of these hinged cantilever truss arms is largely a matter of preference coupled with economics and aesthetics; it is, however, necessary that they be provided with top and bottom chord structure members which are spaced a maximum distance apart vertically at the main tower column or pier and it is further advisable that they converge together outwardly where they eventually are connected at their outer ends. The top and bottom chords forming the cantilever are connected together for proper structural design between their inner and outer ends by means of lateral structural members, which members divide the length of the hinged cantilever truss wind arms into the desired number of panels of equal or unequal lengths. The inward force exerted by the wind cables on the outer ends of the cantilevers are transmitted through the top and bottom chords thereof back to the main towers through the hinged connection and any and all upward or downward forces induced at the ends of these hinged cantilever arms are likewise resisted and transmitted by the top and bottom chords and the lateral system thereof back to the main towers through the hinges.

By means of the foregoing a structure is provided which accomplishes the essential wind bracing efficiently and economically for suspension pipe line bridge structures.

What I claim as new and useful and desire to secure by Letters Patent is:

1. A bridge construction including spaced towers, pipe line carrier members arranged therebetween, main cables looped over said towers and anchored at points spaced therefrom, cantilever members swingably mounted upon fixed pivots and extending laterally of said towers, said cantilever members including spaced upper and lower chords and intermediate braces, the lower chord at a point intermediate its length extending upwardly for junction with the end portion of the top chord, wind cables connecting the outer ends of said cantilever members, connections between said wind cables and said carrier members, said wind cable connections being so constructed and arranged as to retain said wind cable in substantially horizontal parabolic form at each side of said carrier members, and suspender elements connecting the main cables and carrier members.

2. A bridge structure including spaced towers each being provided with laterally extending cantilevers arranged for swinging movement substantially in a horizontal plane on fixed pivots, main cables extending over the towers and anchored at spaced points, said main cables being flexed intermediate said towers and having downwardly extending suspender elements, a supported structure positioned below and intermediate said main cables and connected to said suspender elements, wind braces at each side of the supported structure connecting the outer end portions of said cantilevers for movement therewith, said wind braces extending substantially horizontally inwardly and being connected to said supported structure, and means anchoring said wind braces.

3. A bridge construction including spaced towers, horizontally extending cantilever structures pivotally connected to each side of each of said towers and terminating laterally thereof, main cables connecting the upper portion of said towers and arranged in spaced relation, a supported structure extending between the towers and suspended by the main cables at spaced points, wind cables connecting the outer portions of said pivoted cantilevers for movement therewith, and means connecting the wind cables and supported structure and operating to retain the wind cables in inwardly curved substantially horizontal position.

4. A bridge structure including spaced towers, carrier members arranged therebetween, spaced main cables looped over said towers and anchored at points spaced therefrom, cantilever members pivotally mounted upon said towers, wind cables connecting the outer ends of said cantilever members and movable therewith, converging means retaining said wind cables in parabolic form, and suspension means connecting the main cables and carrier members.

5. A bridge structure including spaced towers, cantilevers connected to said towers and horizontally movable on vertical pivots, anchored wind cables engaging the ends of said levers and movable therewith, spaced connecting means between said wind cables for retaining the same in opposed parabolic form, saddles positioned intermediate said spaced connections and forming a part of said connecting means, anchored main cables connecting the upper portions of said towers and flexed therebetween, and suspension elements connecting said main cables and the saddles.

6. A bridge structure including spaced towers, arms extending laterally from the towers and pivotally supported thereby, a supported structure interposed between said towers, wind cables extending between and engaging the extremities of said arms, connections between the wind cables and supported structure, said connections retaining the wind cables in substantially horizontal position and of parabolical form at each side of the supported structure, main supporting means connecting the upper portions of said towers, and spaced suspension means connecting said main supporting means and said supported structure.

7. A bridge construction including spaced towers, cantilever arms pivoted to and extending laterally from the sides of said towers, supporting elements interposed between the towers, wind cables connected to the end portions of said arms and extending in a substantially transverse parabolic curve at each side of said supporting elements, connections between the cables and supporting elements, main supporting cables extending between the towers, inwardly converging connections between the supporting elements and main supporting cables, and back stays for the cables.

8. A pipe suspension bridge including spaced towers, said towers having lowered strengthened portions, flexible main supporting cables overlying said towers and anchored at their extremities, spaced pipe cradles suspended from said main supporting cables intermediate said towers, laterally extending cantilever supporting structures pivoted to the lower strengthened portions of said towers for horizontal swinging movement, wind cables extending between the outer portions of said cantilevers and anchored at their extremities, said wind cables being connected to said cantilevers for movement therewith and spaced connecting means between said wind cables and cradles intermediate the towers suspending said wind cables in horizontal parabolic form.

9. A pipe suspension bridge including spaced towers, each provided with cantilevers hingedly mounted at its lower outer sides, flexed main cables anchored at their extremities extending over said towers above said cantilevers and arranged in horizontal spaced relation, spaced pipe saddles positioned in longitudinal alinement below and intermediate the cables, a suspender connecting the end of each of said saddles with the adjacent main cable, horizontal inwardly curved wind braces extending over the end portions of said cantilevers, said wind braces being anchored at their extremities at points spaced from said towers and being fixed to the end portions of said cantilevers for movement therewith, and spaced means connecting the wind braces and saddles, at a point intermediate and below the suspender connections.

10. A bridge construction including a pair of spaced towers, cantilever arms pivoted to and extending laterally from said towers for horizontal swinging movement, supporting elements interposed between the towers, wind-cables fixed at their extremities and engaging the outer end portions of said cantilever arms for movement therewith, said wind-cables extending in substantially transverse parabolic form between said arms and at each side of said supporting elements, connections between said wind-cables and supporting elements, main supporting cables extending between the upper portions of said towers, connections between the supporting elements and supporting cables, and backstays for said main cables.

11. A bridge structure including spaced towers, spaced main cables anchored at their extremities and connecting the upper portions of said towers, supporting means extending between the towers, suspenders connecting the main cables and said supporting means, a wind cable arranged at each side of said supporting means, means spacing each wind cable laterally of said support including hinged arms, the inner extremities of said arms being mounted on substantially vertical pivots and the outer portions of said arms being connected to said wind cables for movement therewith, and spaced means connecting each wind cable with said supporting means.

WILDER KENAN.